US012723190B2

(12) United States Patent
Abad et al.

(10) Patent No.: US 12,723,190 B2
(45) Date of Patent: Sep. 1, 2026

(54) CURING ACCELERANT FOR PROPPANT COATING AND METHODS OF USE

(71) Applicant: Schlumberger Technology Corporation, Sugar Land, TX (US)

(72) Inventors: Carlos Abad, Houston, TX (US); Jonathan Abbott, Didcot (GB); Edmund Eswein, Bucharest (RO)

(73) Assignee: chlumberger Technology Corporation, Sugar Land, TX (US)

( * ) Notice: Subject to any disclaimer, the term of this patent is extended or adjusted under 35 U.S.C. 154(b) by 347 days.

(21) Appl. No.: 18/561,546

(22) PCT Filed: May 18, 2022

(86) PCT No.: PCT/US2022/029778

§ 371 (c)(1),
(2) Date: Nov. 16, 2023

(87) PCT Pub. No.: WO2022/245904

PCT Pub. Date: Nov. 24, 2022

(65) Prior Publication Data

US 2024/0263065 A1 Aug. 8, 2024

Related U.S. Application Data

(60) Provisional application No. 63/191,552, filed on May 21, 2021.

(51) Int. Cl.
*C09K 8/80* (2006.01)

(52) U.S. Cl.
CPC .................................. *C09K 8/805* (2013.01)

(58) Field of Classification Search
CPC .................................................... C09K 8/805
USPC ........................................................ 507/201
See application file for complete search history.

(56) References Cited

U.S. PATENT DOCUMENTS 5,218,038 A 6/1993 Johnson
11,753,584 B2 * 9/2023 Mazrooee ................ C09K 8/80 166/276
12,173,234 B2 * 12/2024 Malik ...................... C09K 8/68
2007/0084602 A1 4/2007 Curimbaba
2011/0278003 A1 11/2011 Rediger
2015/0315459 A1 11/2015 McDaniel
2019/0177603 A1 6/2019 Abad
(Continued)

FOREIGN PATENT DOCUMENTS

WO 2014088350 A1 6/2014
WO WO-2022245904 A1 * 11/2022 ............... C09K 8/68

OTHER PUBLICATIONS

Search Report and Written Opinion of International Patent Application No. PCT/US2022/029778 Dated Sep. 6, 2022, 9 Pages.
(Continued)

*Primary Examiner* — Philip C Tucker
(74) *Attorney, Agent, or Firm* — Jeffrey D. Frantz

(57) ABSTRACT

Environmentally acceptable branched alkyl alcohol ethoxylate accelerants for proppants coated with curable phenolic resin coating are described herein. Well treatment fluids described herein include an aqueous medium comprising a branched alkyl alcohol ethoxylate accelerant and a proppant having a curable phenolic resin coating dispersed in the aqueous medium.

13 Claims, 4 Drawing Sheets

(56) References Cited

U.S. PATENT DOCUMENTS

2026/0071533 A1 * 3/2026 Karale .................... E21B 44/00

OTHER PUBLICATIONS

"Phenol Formaldehyde Resin", Wikipedia, downloaded from the internet on Jan. 13, 2025, from [https://en.wikipedia.org/wiki/Phenol_formaldehyde_resin#:~:text=Novolaks%20%28or%20novolacs%29%20are%20phenol-formaldehyde%20resins%20with%20a,itself%2C%20they%20are%20often%20produced%20from%20cresols%20%28methylphenols%29], 5 pages.

* cited by examiner

CURING ACCELERANT FOR PROPPANT COATING AND METHODS OF USE

CROSS-REFERENCE TO RELATED APPLICATIONS

This application claims benefit of U.S. Provisional Patent Application Ser. No. 63/191,552 filed May 21, 2021, which is entirely incorporated herein by reference.

FIELD

Embodiments of the present invention generally relate to use of proppants for stimulation of hydrocarbon reservoirs. Specifically, a new accelerant for proppant curable coatings is described.

BACKGROUND

Propping agents, commonly known as proppants are used when hydrocarbon reservoirs are subjected to hydraulic fracturing. The proppants generally prevent fractures from closing under pressures experienced deep underground. The proppants hold fractures open, allowing reservoir fluids to flow to a well to be produced to the surface. It is generally helpful for the fluid flow not to dislodge the proppants. It is also generally helpful for the proppant materials themselves not to substantially impede fluid flow from the reservoir within the fracture. For these reasons, proppant materials are used that form highly permeable packs, and the proppant materials are frequently coated with a resin.

Two kinds of coatings are generally used for proppant materials. A cured resin coating is mainly used for highly non-round particles, such as naturally occurring sand in applications where proppant backflow is not substantially disadvantageous. Such materials tend to be used in onshore environments where well cleanout and proppant re-deployment is relatively inexpensive. In offshore environments, synthetic propping agents, called synthetic proppants, made of various types of ceramics, calcined bauxite, and the like, are typically used due to their higher permeability, and higher permeability retention under stress. In these offshore markets, a coating is generally used that reduces backflow of proppant from the reservoir. Such coatings are generally uncured or partially cured compositions that can cure to strengthen the resin coating and allow inter-grain contact points to fuse together. The uncured, or curable, resin coatings allow for deployment of proppant into the fractures before the coating cures, resulting in proppant particles adhering to each other as uncured resin coatings come into contact under compressive stress experienced during fracture closure. The curable resin coatings are generally phenolic resin precursors, or prepolymers (i.e. phenol containing compounds and aldehyde containing compounds, such as resoles and or novolacs) that cure when exposed to temperature and pressure for a sufficient time.

In some cases, temperature and pressure within a reservoir may be low such that curable resin coatings cure slowly. In such cases, undesirable proppant flowback can occur before the coatings achieve significant strength. To counteract this effect, accelerants can be added to the proppant mixture to speed development of coating strength and adhesion. While such effects can be beneficial, polymerization too early can cause plugging of equipment and wellbore. Attempts have been made in the past to adjust in-situ properties of the coatings to cure at lower temperatures, but such modifications invariably lead to curing under the hydrostatic conditions that proppant particles would experience in the wellbore for instance prior to reaching a fracture, if fluid pumping is stopped during the treatment, or by not being completely flushed into the fracture, whether on single or multiple stage fracturing treatments. To date, it has not been possible to create a proppant that will cure at low fracture temperatures but will not cure in the wellbore.

Additionally, some very attractive locations for accessing reservoirs where such proppants could be beneficially used are in sensitive off-shore environments where environmentally harmful chemicals cannot be used. Currently, there are no known effective, environmentally acceptable, accelerants for curable phenolic resin coated proppant materials that are usable where such accelerants would be useful.

SUMMARY

Embodiments described herein provide a well treatment fluid that includes an aqueous medium comprising a branched alkyl alcohol ethoxylate molecule and a proppant having a curable phenolic resin coating dispersed in the aqueous medium.

Other embodiments described herein provide a hydraulic fracturing fluid that includes an aqueous medium comprising a branched alkyl alcohol ethoxylate molecule, a viscosifier, and a proppant having a curable phenolic resin coating dispersed in the aqueous medium.

Other embodiments described herein provide a hydraulic fracturing fluid that includes an aqueous medium comprising a branched alkyl alcohol ethoxylate molecule, a viscosifier, a crosslinker composition, an oxidative breaker, and a proppant having a curable phenolic resin coating dispersed in the aqueous medium.

Other embodiments described herein provide a method of treating a hydrocarbon reservoir by conducting a hydraulic fracturing operation on the reservoir and applying a proppant mixture to the fractured reservoir, the proppant mixture comprising an aqueous medium comprising a branched alkyl alcohol ethoxylate molecule and a proppant having a curable phenolic resin coating dispersed in the aqueous medium.

Other embodiments described herein provide a hydraulic fracturing method performed by applying a fracturing fluid to a hydrocarbon reservoir, the fracturing fluid comprising an aqueous medium comprising a branched alkyl alcohol ethoxylate molecule, a viscosifier, and a proppant having a curable phenolic resin coating dispersed in the aqueous medium and pressurizing the fracturing fluid to fracture the hydrocarbon reservoir.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
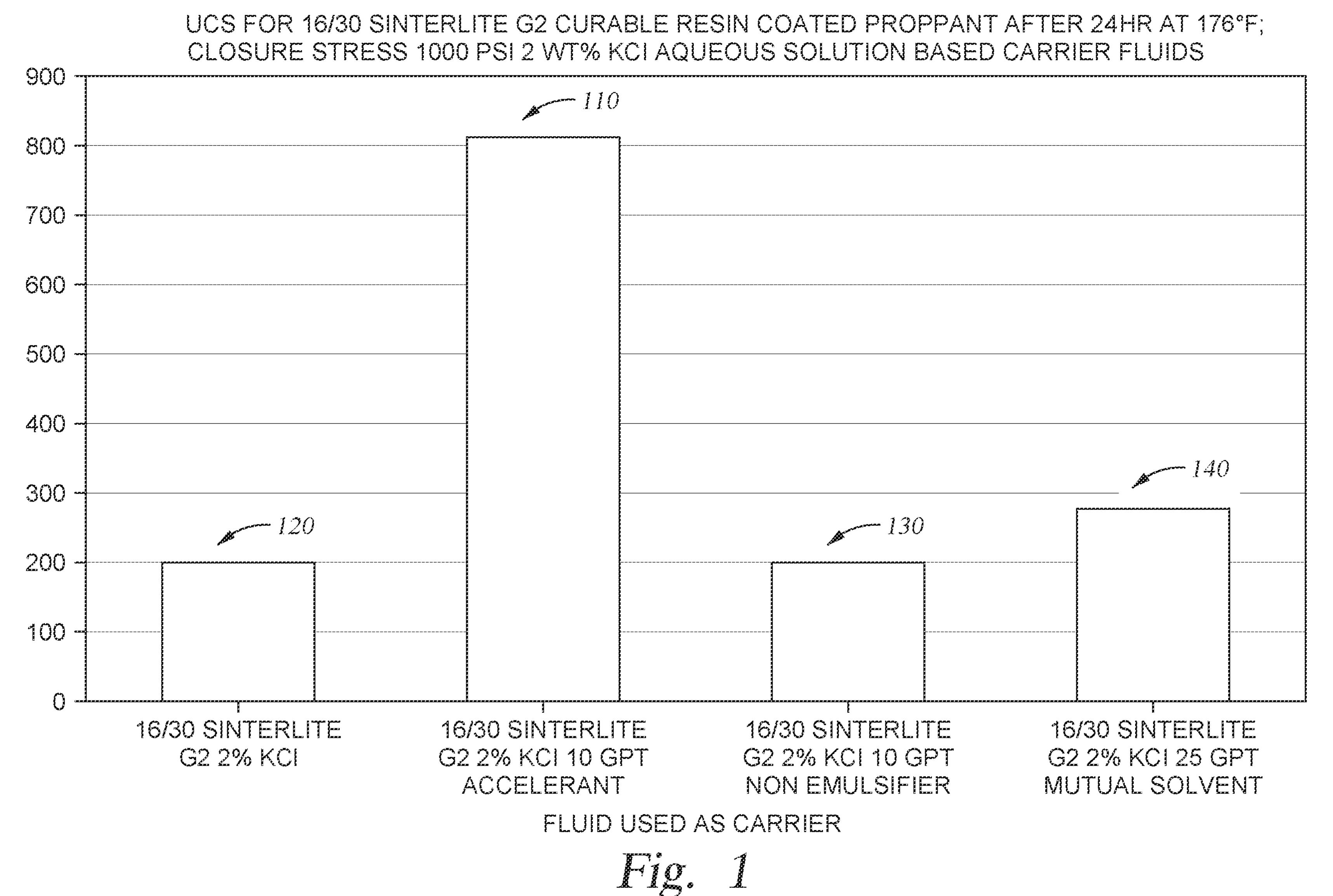
FIG. 1 is a graph showing strength test results for proppants coated with curable phenolic resin components and treated in various ways, according to embodiments described herein.

An accelerant category has been discovered for curable resin coated proppants that is effective and environmentally benign. These accelerants generally meet stringent environmental restrictions such as restrictions imposed by various countries for use in the North Sea. The accelerants described herein are generally used as surfactants in well stimulation applications. It has now been discovered, however, that branched alkyl alcohol ethoxylate surfactants are effective, environmentally friendly, accelerants for curable resin coatings for proppant materials. A specific example of a branched alkyl alcohol ethoxylate that is an effective accelerant for curable proppant coatings is a molecule known as PEG-5 propylheptyl ether, which has the following structure:

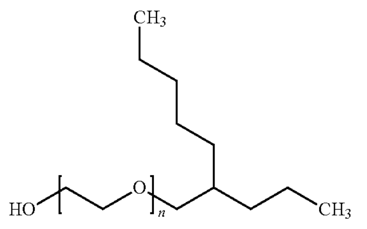

where n is 5. This molecule is available as ARMOCLEAN 4350 from Nouryon of Amsterdam, Netherlands. ARMOCLEAN 4350 with the additives and impurities remaining from its manufacturing process is compliant with relevant North Sea environmental regulations. Best results are obtained if an accelerant package comprising an accelerant described herein and any additives and impurities remaining from its manufacturing process, which has been verified to be compliant with North Sea environmental regulations, is used. PEG-5 propylheptyl ether can also be obtained as Lutensol® M5, available from BASF Corp., of Ludwigshafen, Germany. Use of Lutensol® M5, would be predicated on verifying that it is, or can be made, compliant with environmental regulations.

The material can be deployed in a mixture of proppant having curable resin coating, dispersed in a brine solution, for example fresh water, sea water, an organic clay stabilizer solution, or a inorganic clay stabilizer solution, such as a 2% or a 3% KCl solution. In general, the accelerant is added to a concentration of up to about 20 gallons per thousand gallons of the total mixture (gpt, also mL/L). For low temperature applications, for example where fracturing is conducted at a temperature of 100 to 180 degrees Fahrenheit, the accelerant can be added to a proppant mixture to a concentration of about 5 gpt to about 20 gpt, for example 10 gpt or 15 gpt. For higher temperature applications, for example where fracturing is conducted at an intermediate temperature of 180-250 degrees Fahrenheit, a high temperature of 250-325 degrees Fahrenheit, or a very high temperature of 325-450 degrees Fahrenheit, a lower concentration of accelerant can be used, for example as low as 1 or 2 gpt. Higher temperatures increase activity of the accelerant in activating polymerization or curing of the coating.

The proppant mixtures herein are generally made by forming a solution of a carrier medium with the accelerant and then adding the proppant particulate matter. In one example, 10 gpt of accelerant is added to a solution of 2% KCl in water and mixed to homogeneity. Then, a 16/30 or 20/40 SinterLite® G2 proppant, available from Covia, Corp. of Independence, Ohio, is dispersed into the mixture to form a proppant mixture. The proppant mixture is pumped downhole into the formation and the proppant pack is allowed to develop a target compressive strength before commencing hydrocarbon production from the reservoir. The SinterLite® G2 proppants are also available from Schlumberger, Ltd., as Dynaprop® G2 proppant.

FIG. 1 is a graph showing strength test results for proppants coated with curable phenolic resin components and treated in various ways. At 110 are results for a 16/30 SinterLite® G2 proppant dispersed into a 2% KCl solution having 10 gpt of the above molecule as accelerant. The results are for unconfined compressive strength testing after maintaining the proppant mixture for 24 hours at 80° C. under a closing stress of 1000 psi. As shown in FIG. 1 at 110, after 24 hours, the proppant mixture using the branched alkyl alcohol ethoxylate molecule above, developed a UCS of over 800 psi. Comparative results showing the same proppant in the same brine solution with no accelerant (120), in the same brine solution with a non-emulsifying agent (130), and in the same brine solution with a solvent (140) show little or no strength development. FIG. 1 thus demonstrates that the branched alkyl alcohol ethoxylate molecules described above have activity as accelerants for developing curable phenolic coatings for proppant particles.

Figure 2:
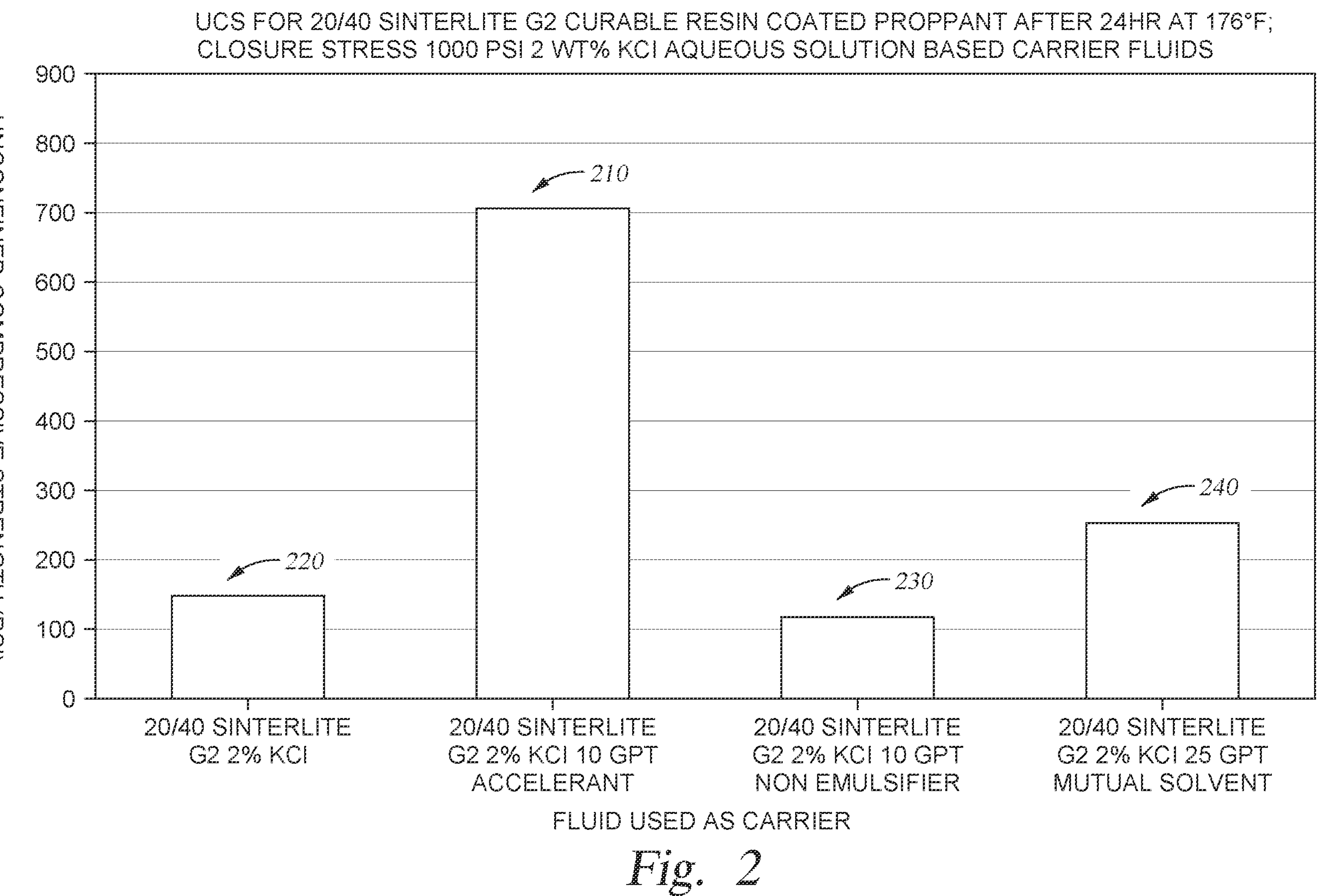
FIG. 2 is a similar graph to FIG. 1, showing results for proppant particles of different size, according to embodiments described herein.

FIG. 2 is a similar graph to FIG. 1, but with 20/40 SinterLite proppant particles with the same G2 coating. The bars in the graph are for the same scenarios as in FIG. 1. Performance of the proppant dispersed into a 2% KCl solution with an accelerant of the types described herein is shown at 210, an accelerant-free comparative example is shown at 220, 230 shows the same brine solution with a non-emulsifying agent, and 240 shows the same brine solution with a solvent. FIG. 2 demonstrates that the branched alkyl alcohol ethoxylate molecules described herein have activity as accelerants for curable coatings for proppant particles.

Figure 3:
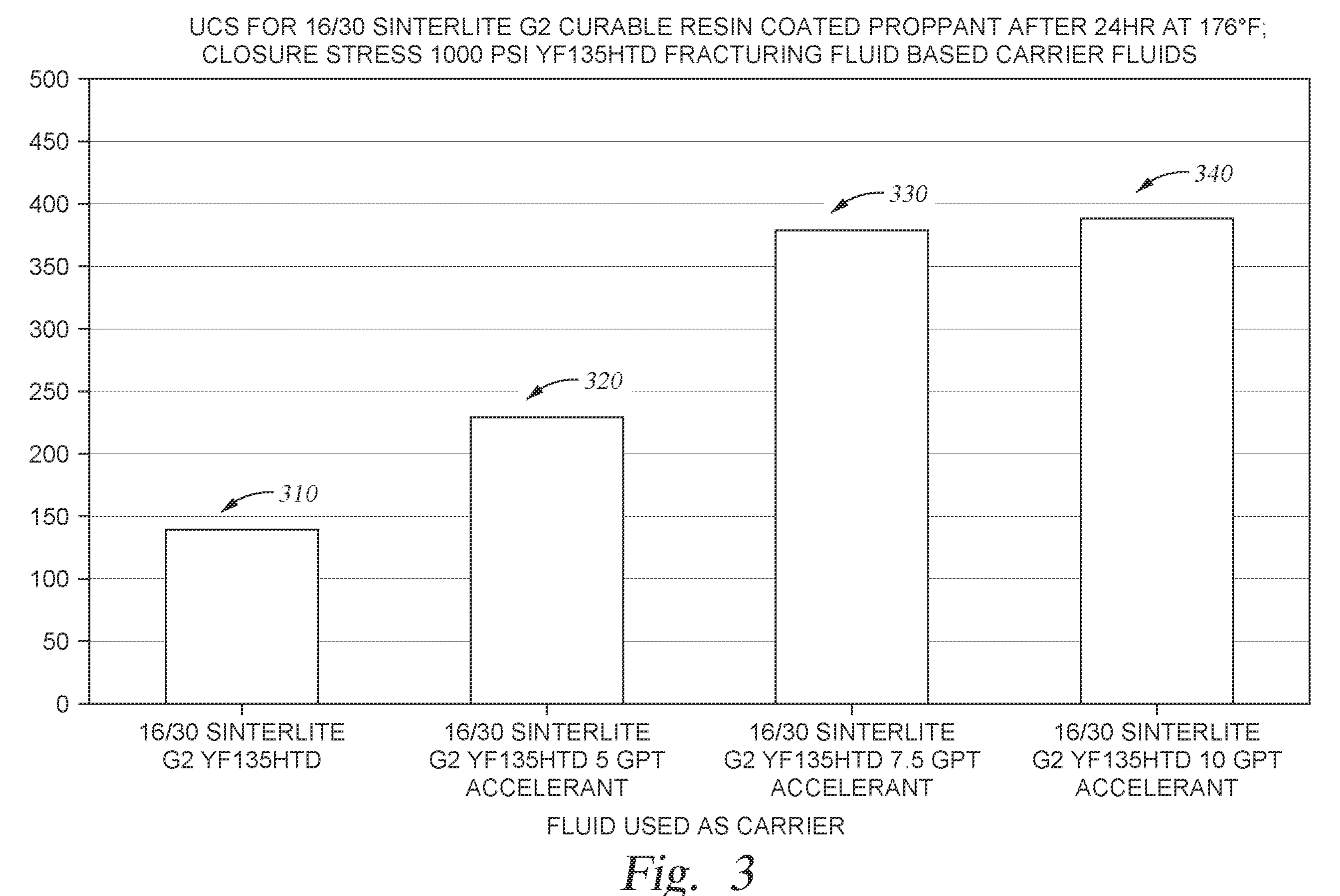
FIG. 3 is a graph showing the effect of accelerants described herein on a fracturing fluid containing proppant, according to embodiments described herein.

The accelerants described herein can also be deployed in fracturing fluids. The fracturing fluids usable with the described accelerants are those free of viscoelastic surfactants. Appropriate fracturing fluids can include proppants such as the SinterLite proppants with G2 coating and a branched alkyl alcohol ethoxylate accelerant. FIG. 3 is a graph showing the effect of the described accelerant on the consolidation of curable resin coated proppant contacted by a fracturing fluid. In FIG. 3, a fracturing fluid of Schlumberger, Ltd., designated YF135HTD, is used as a carrier medium for a 16/30 SinterLite G2 proppant. The YF135HTD fracturing fluid is a borate crosslinked guar based fluid, formulated using a base fluid containing (per each 1000 gallons US) 987 gpt fresh water, 3 weight percent of potassium chloride clay stabiliser, 5 gpt of isopropanol, 0.25 gpt of a bactericide BODOXIN AE, and 8 gpt of a guar polymer slurry which adds 35 pounds per thousand gallon US (ppt) of guar into the base fluid. All concentration numbers in this paragraph are based on 1000 gallon US of the base fluid described above. This base fluid was crosslinked by mixing the base fluid with a crosslinker composition formulated to add into the base fluid 4.15 gpt fresh water, 5.5 gpt of a 30 weight percent sodium hydroxide concentrate pH control agent, 5 ppt boric acid crosslinker, 18 ppt sodium gluconate delay agent, and 0.85 gpt triethanolamine stabilizer. In addition 0.5 ppt ammonium persulfate breaker was included in the crosslinked fluid composition.

At 310, unconfined compressive strength of an accelerant free fracturing fluid mixture is shown; at 320, unconfined compressive strength of the same fracturing fluid mixture with 5 gpt of accelerant is shown; at 330, unconfined compressive strength of the same fracturing fluid mixture with 7.5 gpt of accelerant is shown; and at 340, unconfined compressive strength of the same fracturing fluid mixture with 10 gpt of accelerant is shown. The accelerant is seen to improve compressive strength results.

Curable phenolic resin coated proppant materials that are usable as synthetic proppants in combination with the accelerants described herein are high permeability synthetic proppants manufactured for instance from calcined materials such as silica, clays, kaolins, zeolites, bauxite and the like, and combinations thereof. Such proppants come in multiple sizes, which can be described by their larger and smaller mesh sizes, such as 12/14, 14/16, 12/18, 16/20, 16/30, 20/30, 20/40, 30/50, and mixtures thereof. Such proppant products can be spherical, quasi-spherical, ellipsoidal, or rodlike synthetic proppants, and mixtures thereof, coated with curable coatings such as the Covia G2 resin. Such proppant products include low strength, intermediate strength and high strength synthetic proppants. Commercial products include examples such as G2 coated CarboLite proppants, G2 coated CarboProp proppants, G2 coated CarboHSP proppants, G2 coated MaxPROP, G2 coated SinterLite proppants, G2 coated SinterBall proppants, G2 coated SinterMax proppants, G2 coated SinterProp proppants, G2 coated RodProp proppants, G2 coated ProLite proppants, G2 coated DynaProp proppants, G2 coated HyperProp proppants, G2 coated TechProp proppants, G2 coated BorProp proppants, G2 coated PTProp proppants, G2 coated ForeProp proppants, G2 coated ROSPROP proppants, G2 coated EconoProp proppants, G2 coated HydroProp proppants, G2 coated Kryptosphere LD, and G2 coated Kryptosphere XT.

For all the examples above, the accelerant used is the PEG-5 propylheptyl ether molecule shown above. It should be noted, however, that molecules having structural similarity to the PEG-5 propylheptyl ether can also work as accelerants in the compositions described herein. In general, branched alkyl alcohol ethoxylate surfactants, sometimes called Guerbet alcohol surfactants or Guerbet surfactants, are a class of compounds usable as accelerants herein. The surfactants that can act as effective accelerants for curable phenolic resin proppant coatings have the general structure

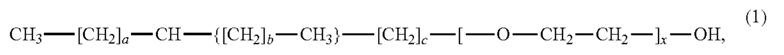

$$CH_3—[CH_2]_a—CH—\{[CH_2]_b—CH_3\}—[CH_2]_c—[—O—CH_2—CH_2—]_x—OH, \quad (1)$$

where a, b, and c are integers that are each greater than or equal to 0, where a≤y−3, b≤y−3, c≤y−3, where y is an integer greater than or equal to 6 and less than or equal to 36, y being defined as the sum of the integer 3 and a, b and c (y=a+b+c+3) and x is an integer of from about 1 to about 12. In some cases, the structure is

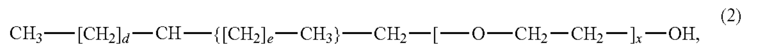

$$CH_3—[CH_2]_d—CH—\{[CH_2]_e—CH_3\}—CH_2—[—O—CH_2—CH_2—]_x—OH, \quad (2)$$

where d and e are integers that are each greater than or equal to 0, where d≤z−4, e≤z−4, where z is an integer greater than or equal to 6 and less than or equal to 36, z being defined as the sum of the integer 4 and e, d and c (z=d+e+4) and x is an integer of from about 1 to about 12. Structure 2 is a category of structure 1 where c=1. In some cases, the structure is

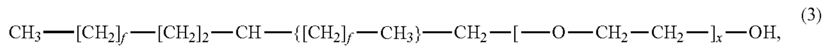

$$CH_3—[CH_2]_f—[CH_2]_2—CH—\{[CH_2]_f—CH_3\}—CH_2—[—O—CH_2—CH_2—]_x—OH, \quad (3)$$

where f is an integer and is greater than or equal to 1 and x is an integer of from about 1 to about 12. Structure 3 is a category of structure 1 where c=1 and a=b+2. Structure 3 is a category of structure 2 where d=e+2.

PEG5 propylheptyl ether is an example of structure 1 where x=5, a=4, b=2, and c=1, and of structure 2 where d=4 and e=2, and of structure 3 where f=2, Other branched alkyl alcohol PEG5 ethers can be used instead of, or in addition to, PEG5 propylheptyl ether. For example, branched alkyl alcohol PEG3 ethers, such as PEG3 propylheptyl ether (x=3), branched alkyl alcohol PEG7 ethers, such as PEG7 propylheptyl ether (x=7), and branched alkyl alcohol PEG9 ethers, such as PEG9 propylheptyl ether (x=9), are available as species matching structures 1, 2, and 3. As noted above, any branched alcohol ethoxylate surfactant having from one to twelve ethoxy units in the ethoxylate portion is usable for the purposes herein.

The alkyl portion of the molecule can vary as well. The number of carbon atoms between the ethoxylate chain and the branching point of the molecule can be zero or as high as 33, and each branch of the alkyl portion of the molecule can have up to 34 carbon atoms, provided that the alkyl portion of the molecule has no more than 36 carbon atoms. Versions of the molecules described herein are available as PEG3, PEG5, PEG7, and PEG9 ethoxylates having branched alkyl portions with 12 carbon atoms, usually as a 2-butyloctyl group.

Mixtures of branched alkyl alcohol ethoxylate molecules can also be used. For example, most commercial sources of such molecules are mixtures having a distribution of ethoxylate chain lengths and alkyl structures. The sources of PEG5 propylheptyl ether generally have ethoxylate chain length distribution of 4.5±1.5 averaging around 4.95. Branched alkyl alcohol ethoxylate molecules with a single alkyl structure are expected to yield better degradability, toxicity and or bioaccumulation test results. Branched alkyl alcohol ethoxylate molecules with narrow distributions of ethoxylate groups (CH2-CH2-O)— are also expected to yield better degradability, toxicity and or bioaccumulation test results. Branched alkyl alcohol ethoxylate molecules with a single alkyl structure and with narrow distributions of ethoxylate groups (CH2-CH2-O)— are also expected to yield best degradability, toxicity and or bioaccumulation test results.

The G2 coating of the SinterLite® products mentioned above is a coating of phenolic resin polymerization reactants having a molar ratio of phenolic hydroxyl groups to aldehyde groups (formaldehyde and/or paraformaldehyde) that is greater than 1. When appropriately catalyzed using acid conditions, the polymerization of such compositions proceeds by connecting phenolic units with methylene groups to form substantially linear polymer chains. The coating of the proppant grains, and the thermal process during and following the coating stage extend the phenolic resins structure. The process for manufacturing the curable resin coated proppants described herein results in a partially cured resin coating for the proppant grains. Using the accelerants described herein allows time during a fracturing treatment for proppant grains to disperse into a fractured formation, and for proppant grains that come into contact with other proppant grains under significant closure stress (such as during fracture closure) to stick together to form an extended structure that further develops strength as the coating polymerizes. The extended structure eventually develops strength enough to prevent complete closure of fractures in the formation while maintaining permeability of the formation for fluid flow, and also while preventing individual proppant grains from returning to the wellbore.

The combination of a curable resin coating that cures slowly at low fracture temperatures with an accelerant as described herein solves the problem of achieving cure of the resin coating in the formation and not in the wellbore. Simply adjusting the kinetics of the resin coating itself causes earlier curing of the resin coating and risks curing in the wellbore before the proppant reaches the formation. Use of an accelerant that is not part of the coating itself results in a modified curing profile that avoids curing in the wellbore but still enables curing at low fracture temperatures.

Figure 4:
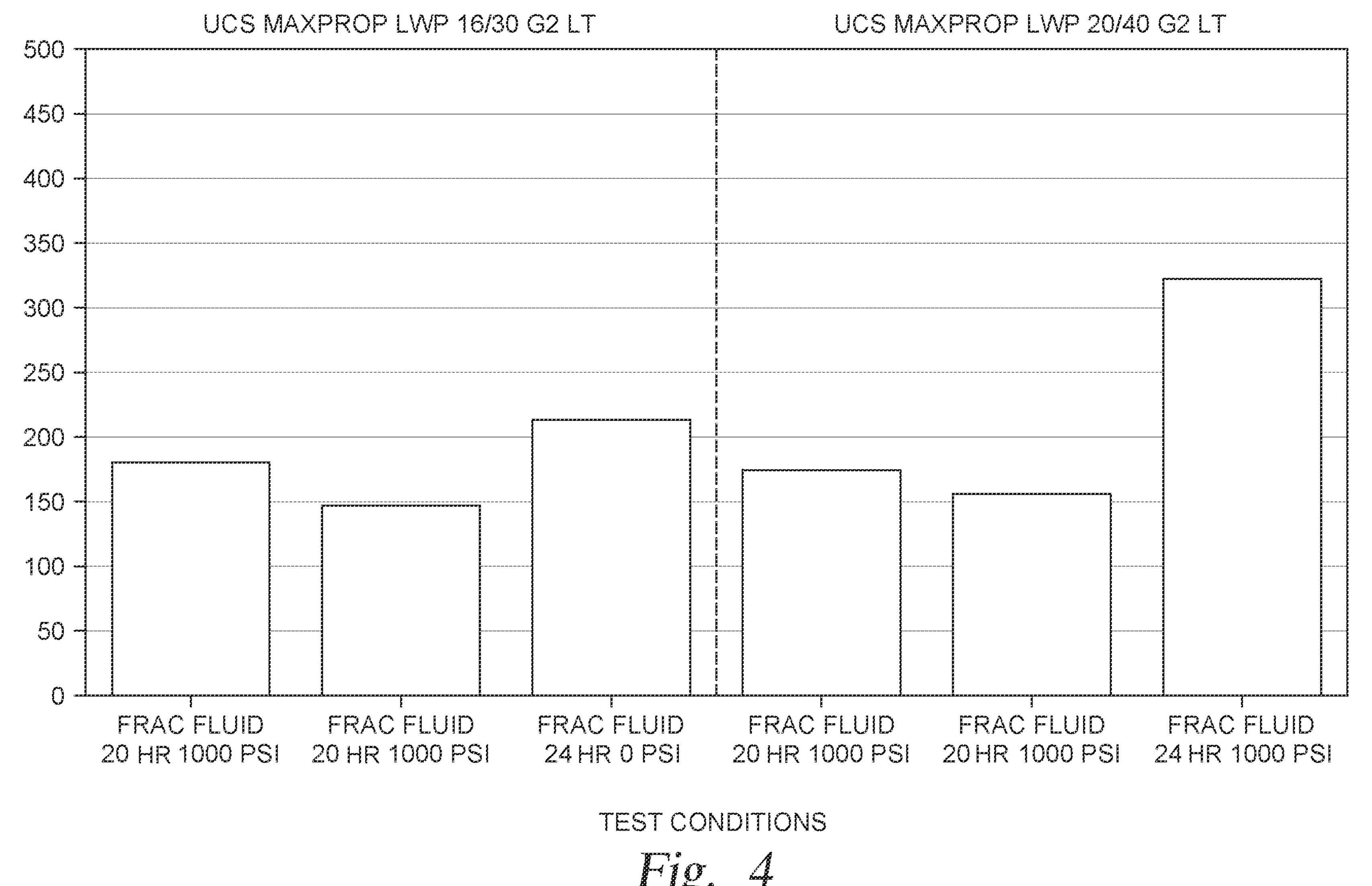
FIG. 4 a graph showing comparative data where a conventional attempt was made to accelerate curing of proppant coatings.

FIG. 4 presents comparative data where an attempt was made to accelerate curing of the coating by adjusting composition of the curable resin coating to promote curing at lower temperatures. These coatings did not display acceptable UCS, and were observed to set in hydrostatic wellbore conditions, demonstrating the difficulty of formulating a curable resin coating that can meet the requirements of environmentally acceptable low-temperature curing coated proppants.

The proppant mixtures described herein can also be useful where fracture conditions change during stimulation. For example, pumping treatment fluids into a reservoir can reduce temperatures in areas of the reservoir exposed to the fluids. Thus, an accelerant-free proppant mixture having proppant coated with a curable resin can be pumped into a formation having sufficient temperature, for example 200° F. or more, to treat a first plurality of fractures in the formation. The accelerant-free proppant mixture flows into the formation, cooling areas of the formation near where the accelerant-free proppant mixture is introduced. To continue treating additional fractures in the formation, an accelerated proppant mixture having proppant coated with a curable resin along with any of the accelerants described herein, is pumped into the formation. The accelerated proppant mixture facilitates curing of the proppant coatings at somewhat lower temperatures, without risking wellbore curing, so the proppant of the accelerated proppant mixture can perform satisfactorily even at temperatures reduced by introduction of the accelerant-free proppant mixture to the formation.

The accelerant can be separately provided to the fracturing fluid as the fluid is pumped downhole. Independently metering the accelerant into the fracturing fluid can provide flexibility to change concentration or amount of accelerant used during treatments and for different stages of treatment. The exact composition of the fracturing fluid using proppant with curable resin coating can be tailored on site to changing downhole conditions to closely manage and optimize performance of the fracturing fluid. Such methods can also be particularly useful in offshore environments where space for storing different mixtures is limited.

The fracturing fluids usable with these types of curable resin coated proppants and accelerants are generally based on an aqueous medium, which may be water or brine, which is a solution of a salt, such as potassium chloride, choline chloride, or ammonium chloride, in water. Alkyl halide salts are used, and organic salts and divalent salts can be included as well. The fracturing fluids can have polymer viscosifiers, for example galactomannan polymers of various types such as guar gum, a high-molecular weight polysaccharide composed of mannose and galactose sugars, or guar derivatives such as hydropropyl guar (HPG), carboxymethyl guar (CMG), and carboxymethylhydroxypropyl guar (CMHPG), which can be used in either crosslinked form, or without crosslinker in linear form. Cellulose derivatives such as hydroxyethylcellulose (HEC) or hydroxypropylcellulose (HPC) and carboxymethylhydroxyethylcellulose (CMHEC) may also be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers can be used as well. Hydroxypropyl guar, carboxymethyl hydroxypropyl guar, carboxymethyl guar, cationic functional guar, guar or mixtures thereof, can be used as gelling agents. Acid degradable particulates and fibers can also be used that include polymers derived from citric acid, glycolic acid, lactic acid, 3-hydroxybutanoic acid, 3-hydroxypentanoic acid, maleic acid, oxalic acid, succinic acid, and fumaric acid, glutaric acid, adipic acid, and the like. Acid compositions comprising acids such as hydrochloric acid, sulfuric acid, phosphoric acid, nitric acid, formic acid, acetic acid, sulfamic acids, citric acid, glycolic acid, lactic acid, maleic acid, boric acid, oxalic acid, succinic acid, and fumaric acid can also be included. The fracturing fluids may also include gas components, for example in a foam. The gas components can be atmospheric gases such as nitrogen, argon, or carbon dioxide, or just air. Foaming agents can be included. Other components, such as friction reducers, viscosity breakers, and fiber components can be included as well. A viscosity breaker can be a material selected from the group consisting of an oxidative viscosity breaker, an encapsulated oxidative viscosity breaker, and an enzymatic viscosity breakers. A mixture of such viscosity breakers can also be used. Fracturing fluids containing any or all of these components, in any suitable combination, can also contain the proppants and accelerants described herein. The compatibility of the proppants and accelerants used with the fracturing fluid can be achieved by configuring the fluid viscosity to comply with the fracturing treatment design objective. The proppants, deployed using such fracturing fluids, will perform as described above.

In addition to being effective for providing desired low temperature curing in a fracture formation, the branched alkyl alcohol ethoxylate surfactant-accelerants described herein do not damage the environment. These surfactant-accelerants meet environmental regulations for use in the most environmentally sensitive offshore prospecting locations in the world. The surfactants described herein receive a "gold" rating without any "substitution warning" in the OSPAR Harmonised Mandatory Control Scheme. To receive such a rating, these surfactants achieve a Hazard Quotient, in the Chemical Hazard Assessment and Risk Management model, of less than 1 and greater than 0. To achieve such rating, a material must exhibit aquatic toxicity less than 1 ppm (according to algae EC50, crustacean LC50, and fish LC50 toxicity tests) and sediment toxicity less than 10 ppm (according to sediment reworker LC50 tests). The substance must also biodegrade by more than 60% within 28 days, according to the OECD 306,301B-F method, or more than 70% in 28 days, according to the OECD 301A or E methods. The substance must also be non-bioaccumulative (log $P_{ow}$<3 or BCF≤100).

While the foregoing is directed to embodiments of the present invention, other and further embodiments of the present disclosure may be devised without departing from the basic scope thereof, and the scope thereof is determined by the claims that follow.

What is claimed is:

1. A method of treating a hydrocarbon reservoir, comprising:

conducting a hydraulic fracturing operation to fracture the hydrocarbon reservoir;

applying an accelerant-free proppant mixture to the fractured hydrocarbon reservoir, wherein the accelerant-free proppant mixture comprises a proppant having a curable phenolic resin coating;

applying an accelerated proppant mixture to the fractured hydrocarbon reservoir, wherein the accelerated proppant mixture comprises:

an aqueous medium comprising an accelerant, wherein the accelerant comprises a branched alkyl alcohol ethoxylate molecule; and the proppant having the curable phenolic resin coating dispersed in the aqueous medium; and adjusting a concentration of the accelerant in the accelerated proppant mixture applied to the fractured hydrocarbon reservoir in response to a stage of treatment and one or more downhole conditions, wherein adjusting the concentration of the accelerant comprises independently metering the accelerant to cause:

decreasing of the concentration in response to an increase in a temperature of the one or more downhole conditions; and increasing of the concentration in response to a decrease in the temperature of the one or more downhole conditions.

2. The method of claim 1, wherein the branched alkyl alcohol ethoxylate molecule is PEG-5 propylheptyl ether.

3. The method of claim 1, wherein the branched alkyl alcohol ethoxylate molecule has the structure

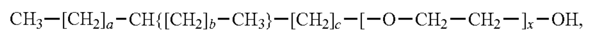

$CH_3-[CH_2]_a-CH\{[CH_2]_b-CH_3\}-[CH_2]_c-[-O-CH_2-CH_2-]_x-OH$, wherein a, b, and c are integers that are each greater than or equal to 0, a≤y−3, b≤y−3, c≤y−3, wherein y is an integer greater than or equal to 6 and less than or equal to 36, y=a+b+c+3, and x is an integer of from about 1 to about 12.

4. The method of claim 1, wherein the branched alkyl alcohol ethoxylate molecule is a branched alkyl PEG5 or PEG3 ether.

5. The method of claim 1, wherein the branched alkyl alcohol ethoxylate molecule meets environmental regulations.

6. A hydraulic fracturing method, comprising:

applying an accelerant-free proppant mixture to a hydrocarbon reservoir, wherein the accelerant-free proppant mixture comprises a first proppant having a first curable phenolic resin coating; and applying an accelerated proppant mixture to the hydrocarbon reservoir, wherein applying the accelerated proppant mixture comprises:

pumping a proppant mixture into a wellbore, wherein the proppant mixture comprises an aqueous medium and a second proppant having a second curable phenolic resin coating; and independently metering an accelerant into the proppant mixture to adjust a concentration of the accelerant in the accelerated proppant mixture, wherein the accelerant comprises a branched alkyl alcohol ethoxylate molecule configured to activate polymerization or curing of at least one of the first curable phenolic resin coating or the second curable phenolic resin coating, wherein independently metering comprises decreasing of the concentration in response to an increase in a temperature of the one or more downhole conditions, increasing of the concentration in response to a decrease in the temperature of the one or more downhole conditions, or both.

7. The hydraulic fracturing method of claim 6, wherein the branched alkyl alcohol ethoxylate molecule is PEG-5 propylheptyl ether.

8. The hydraulic fracturing method of claim 6, wherein the branched alkyl alcohol ethoxylate molecule has the structure

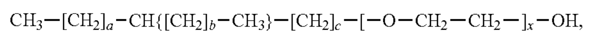

$CH_3-[CH_2]_a-CH\{[CH_2]_b-CH_3\}-[CH_2]_c-[-O-CH_2-CH_2-]_x-OH$, wherein a, b, and c are integers that are each greater than or equal to 0, a≤y−3, b≤y−3, c≤y−3, wherein y is an integer greater than or equal to 6 and less than or equal to 36, y=a+b+c+3, and x is an integer of from about 1 to about 12.

9. The hydraulic fracturing method of claim 6, wherein the branched alkyl alcohol ethoxylate molecule is a branched alkyl PEG5 or PEG3 ether.

10. The hydraulic fracturing method of claim 6, wherein the branched alkyl alcohol ethoxylate molecule has aquatic toxicity less than 1 ppm and sediment toxicity less than 10 ppm, biodegrades by more than 60% in 28 days, and is non-bioaccumulative.

11. The hydraulic fracturing method of claim 6, wherein the accelerated proppant mixture further comprises a material selected from the group consisting of an oxidative viscosity breaker, an encapsulated oxidative viscosity breaker, and an enzymatic viscosity breaker.

12. The method of claim 1, wherein at least one of the accelerant-free proppant mixture or the accelerated proppant mixture further comprises a material selected from the group consisting of an oxidative viscosity breaker, an encapsulated oxidative viscosity breaker, and an enzymatic viscosity breaker.

13. The method of claim 1, wherein the accelerant activates polymerization or curing of the curable phenolic resin coating.

* * * * *